Figure 1:
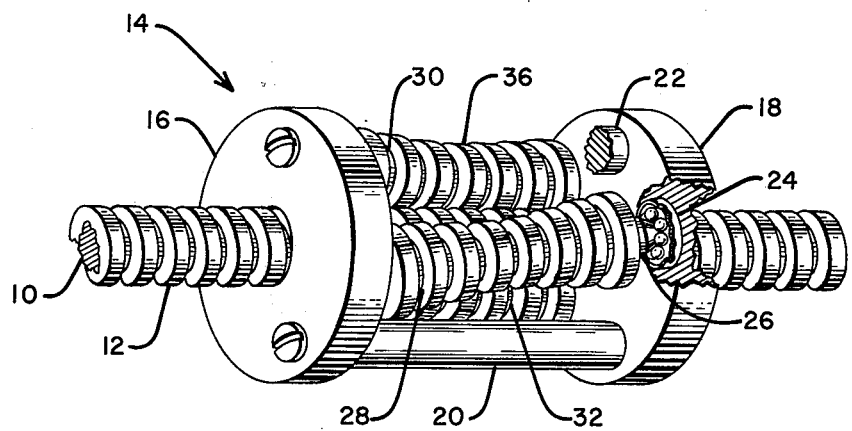

Aug. 27, 1963 V. H. HAYES 3,101,623
CARRIAGE TRANSLATING DEVICE
Filed Sept. 19, 1961

INVENTOR
VERNON H. HAYES
BY Thomas J. Nikolai
AGENT

United States Patent Office 3,101,623
Patented Aug. 27, 1963

3,101,623
CARRIAGE TRANSLATING DEVICE
Vernon H. Hayes, Minneapolis, Minn., assignor to Sperry Rand Corporation, New York, N.Y., a corporation of Delaware
Filed Sept. 19, 1961, Ser. No. 139,202
6 Claims. (Cl. 74—424.8)

This invention relates to improvements in a lead screw and nut arrangement for driving the carriage of precision instruments and the like.

In mechanisms of the screw and nut type, the desired carriage movement is obtained by relative axial movement between the nut and screw resulting from the relative rotation of the screw. One part, normally the screw, is held fixed to prohibit axial displacement while the other is connected to the carriage to impart movement thereto along the axis of the screw.

In order to achieve a higher degree of mechanical efficiency in such devices, it is desirable to reduce as much as possible any frictional forces which may exist between the screw and nut. One approach which has been used to reduce friction is to provide rolling contact between the screw and the nut. A typical example of the prior art is shown in the Anderson Patent 2,488,256, which issued November 15, 1959. This patent shows a carriage member having a plurality of roller contacts mounted therein. The roller members are provided with a set of lands and grooves on each end thereof, arranged to cooperate with the helical thread on the jack screw passing therebetween. In order to reduce the frictional forces these dumbbell shaped rollers are mounted at an angle with respect to the axis of the screw. The angle is determined by the pitch of the threads on the lead screw, the arrangement being such that the thread engaging portions of the rollers are parallel to the face of the screw threads. While this patented device may be suitable for some applications, it is not wholly satisfactory where the loads involved are large. This is due to the fact that only a relatively few lands on the extremities of the rollers are actually engaged with the screw itself so that mechanical wearing is concentrated in a small area.

The present invention obviates the inherent disadvantage of the above mentioned device in that the entire surface of the roller members are provided with thread engaging segments. This being the case, any wearing of the rollers is distributed over their entire surface.

It is accordingly an object of the present invention to provide an improved antifriction rolling contact between a movable carriage and a lead screw for causing translatory motion of the carriage.

It is another object of the invention to provide a more efficient translating device which is suitable for use under high loading to obtain very low frictional resistance.

It is a further object of this invention to provide an improved roller member wherein the rollers engage the screw over a relatively large surface area.

Figure 2:
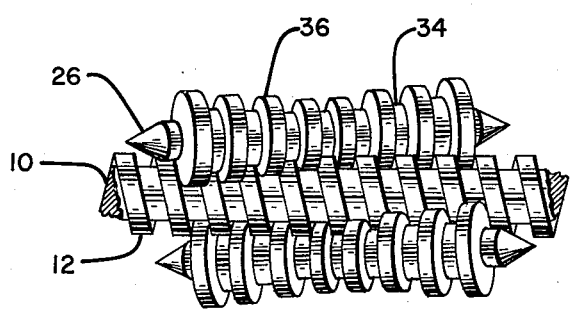

Objects and advantages other than those above set forth will become apparent from the following description when read in connection with the accompanying drawings, in which:

FIG. 1 illustrates in simplified form the carriage translating device of the present invention; and, FIG. 2 illustrates the details of the roller member employed in the apparatus of FIG. 1.

Referring first to FIG. 1, numeral 10 designates a screw having a helical groove or thread 12 of suitable pitch. The screw 10 passes through a carriage 14 and when the screw is rotated translatory motion is imparted to the carriage. As illustrated, carriage 14 comprises a pair of end plates 16 and 18 which are maintained in a fixed and spaced apart parallel relationship by means of spacers 20 and 22. Mounted within these end plates are a set of bearings 24 which may be of the ball and race type. The bearings are designed to accommodate the conical bearing surface 26 of the rollers 28, 30 and 32. It should be understood that other types and arrangements of bearings may be employed and limitation to the one shown is not to be inferred. As can be seen from FIG. 1, the bearings 24 for the roller 28 are located in the end plates 16 and 18 so that the axis of the roller is at an angle with respect to the axis of the screw 10. Similarly, the bearings for the other two rollers are also mounted in the end plates so that their associated rollers also have their axes at an angle with respect to screw 10. While only three such rollers are illustrated, it should be understood that a different number may be employed depending on the particular application in question.

Each roller is provided with a plurality of parallel annular grooves 34 which define a plurality of lands 36. The dimensions of these lands are such that they mesh with the thread 12 on the screw. As has already been mentioned, the axes of the rollers are not parallel to that of the screw but are disposed at an angle so that the lands 36 are substantially parallel to the threads at the points of contact between the lands and the thread.

Since the rollers are preferably at an angle with respect to the axis of the screw, it becomes readily apparent that the rollers may not be simple cylinders. If such were the case, only very few lands located at the center of a cylindrical roller would engage with the screw. In order to achieve engagement between the rollers and the screw over the entire length of the rollers, the rollers 28, 30 and 32 are contoured. More specifically, as can be most clearly seen in FIG. 2, the rollers have a substantially larger diameter at the extremities thereof than they do in their central portion. Because of this contour all of the lands, including those near the ends of the rollers, engage or mesh with the threads of the screw in spite of the fact that the roller axes and screw axis are not parallel.

As has been mentioned, rollers are contoured. From the geometry involved it can be shown that the contour defines a hyperboloid of one sheet. More specifically, in order for the entire surface of the roller to be in contact with a cylinder when their respective axes are not mutually parallel, it is necessary that the roller have a cross-section which is defined by a hyperbolic curve. The equation for the hyperbola, which when rotated about its axis will generate the desired roller shape, is dependent upon the angle between the axis of the cylinder and the axis of revolution, and the radius of the cylinder (the screw) employed.

Design considerations such as the axial and radial loads and the frictional load limitations determine the size of the screw and roller, the size and type of the bearings to be employed, and the form of thread. Torque and speed ratio requirements of the particular application where the device is to be used determine the thread pitch and therefore the angular alignment of the roller axes.

The advantages of the invention are chiefly that there is a greater contact surface and a greater number of teeth in full engagement to sustain the load, that the pressure on the mating surface is always in a line perpendicular to the radius of the screw and that rolling contact is maintained between the lead screw and the carriage to be driven.

Although but one embodiment of the present invention has been illustrated and described, it will be apparent that various changes and modifications may be made therein without departing from the invention as defined in the appended claims.

What is claimed is:

1. In a device of the class described, driving and driven members disposed for relative rotational and longitudinal movement, one of said members having a periphery forming a helical thread, the other of said members comprising a carrier encompassing a predetermined section of said thread, and a plurality of thread-engaging elements rotatably mounted in said carrier about separate axes respectively at an angle to the axis of said one member, said elements being grouped peripherally about said one member and having thread-engaging portions, said thread-engaging portions being contoured for contacting said one member over substantially all of said predetermined section.

2. In a device of the class described, driving and driven members disposed for relative rotational and longitudinal movement, one of said members having a periphery forming a helical thread, the other of said members comprising a carrier encompassing a predetermined section of said thread, and a plurality of thread-engaging roller elements rotatably mounted in said carrier about separate axes respectively at an angle to the axis of said one member, said elements being grouped peripherally about said one member and having thread-engaging portions, said thread-engaging portions being contoured for contacting said one member over substantially all of said predetermined section, said angle being such that said thread-engaging portions are substantially parallel to the helical thread on said one member.

3. In a device of the class described, driving and driven members disposed for relative rotational and longitudinal movement, one of said members having a periphery forming a helical thread, the other of said members comprising a carrier encompassing a predetermined section of said thread, and a plurality of thread-engaging elements rotatably mounted in said carrier about separate axes respectively at an angle to the axis of said one member, said elements being grouped peripherally about said one member and having thread-engaging portions, said thread-engaging portions having hyperbolically disposed thread-engaging contoured surfaces for contacting said one member over substantially all of said predetermined section.

4. In a device of the class described, driving and driven members disposed for relative rotational and longitudinal movement, one of said members having a periphery forming a helical thread, the other of said members comprising a carrier encompassing a predetermined section of said thread, and a plurality of thread-engaging elements rotatably mounted in said carrier about separate axes respectively at an angle to the axis of said one member, said elements being grouped peripherally about said one member and having a hyperbolically shaped cross-section with thread-engaging portions for contacting said one member over substantially the entire length of said elements.

5. In a device of the class described, driving and driven members disposed for relative rotational and longitudinal movement, one of said members having a periphery forming a helical thread, the other of said members comprising a carrier encompassing a predetermined section of said thread, a plurality of hyperbolically shaped rollers having lands and grooves over substantially the entire length thereof, and means for rotatably mounting said rollers in said carrier with the axis of each roller disposed at an angle to the axis of said one member substantially equal to the pitch angle of the thread on said one member.

6. In a device of the class described, driving and driven members disposed for relative rotational and longitudinal movement, one of said members having a periphery forming a helical thread, the other of said members comprising a carrier encompassing a predetermined section of said thread, a plurality of hyperbolically shaped rollers having parallel annular lands and grooves over substantially the entire length thereof, and means for rotatably mounting said rollers in said carrier with the axis of each roller disposed at an angle to the axis of said one member substantially equal to the pitch angle of the thread on said one member.

References Cited in the file of this patent
UNITED STATES PATENTS 2,488,256     Anderson _____ Nov. 15, 1949

FOREIGN PATENTS 805,832     Germany _____ June 14, 1951